United States Patent [19]

Kushida et al.

[11] 4,400,684
[45] Aug. 23, 1983

[54] FAST RESPONSE TEMPERATURE SENSOR

[75] Inventors: Toshimoto Kushida, Dearborn; William A. Fate, Ann Arbor, both of Mich.

[73] Assignee: Ford Motor Company, Dearborn, Mich.

[21] Appl. No.: 297,679

[22] Filed: Aug. 31, 1981

[51] Int. Cl.³ .............................................. H01C 3/04
[52] U.S. Cl. ...................................... 338/25; 374/208
[58] Field of Search ................. 338/22 R, 22 SD, 25, 338/307–309, 314; 73/362 AR; 29/610 R, 612; 374/183, 185, 194, 208

[56] References Cited

U.S. PATENT DOCUMENTS

| | | | |
|---|---|---|---|
| 3,200,326 | 8/1965 | Pritikin et al. | 323/378 |
| 3,334,322 | 8/1967 | Bales | 73/362 AR X |
| 3,381,253 | 4/1968 | Sapoff et al. | 73/362 AR X |
| 3,392,054 | 7/1968 | Sapoff et al. | 29/610 R |
| 3,845,443 | 10/1974 | Fisher | 338/25 |
| 3,893,230 | 7/1975 | Stadler et al. | 29/625 |
| 3,920,172 | 11/1975 | Rhee | 29/592 |
| 4,011,654 | 3/1977 | Beaudoin et al. | 29/612 |
| 4,050,052 | 9/1977 | Reichelt et al. | 338/314 X |
| 4,135,179 | 1/1979 | Snyder | 338/25 X |
| 4,139,833 | 2/1979 | Kirsch | 338/25 X |

*Primary Examiner*—C. L. Albritton
*Attorney, Agent, or Firm*—Peter Abolins; Clifford L. Sadler

[57] ABSTRACT

This specification discloses a fast response temperature sensor assembly wherein a surrounding substrate having a low thermal conductivity and low heat capacity is coupled to a fast response temperature sensor. Foam glass is an advantageous material for use as the support substrate.

7 Claims, 3 Drawing Figures

FAST RESPONSE TEMPERATURE SENSOR

BACKGROUND OF THE INVENTION

1. Field of the Invention

This invention relates to fast responding temperature sensors having a structural support.

2. Prior Art

Temperature sensing is becoming increasingly important for advanced automobile engine control. For example, operation of an air fuel ratio control system may require determination of the temperature of the incoming air. For an idealized temperature probe, the temperature change of the probe is a function of the amount of heat going into the probe which is dependent upon the specific heat of the probe and the probe mass. Known temperature sensors include a thermocouple having a relatively sturdy structure and a relatively long delay in response to temperature change. Faster responding temperature sensors are also known, but they are generally too fragile or are otherwise impractical for in car use.

The prior art indicates that there is tradeoff between speed of response and the rigidity of the temperature sensor. For example, attaching a substrate to a fast responding fragile sensor in order to render it more durable results in an increased response time. Typically, the increase in response time made the "fast" response sensor comparable to the sturdier sensor with a slower response time. These are some of the problems this invention overcomes.

SUMMARY OF THE INVENTION

In order to reduce heat leakage from a fast response temperature sensor this invention teaches using a mechanical support of a material having low density and low thermoconductivity. For example, a foam glass material can improve temperature sensor response times by factor of about 400 in comparison to glass.

In accordance with an embodiment of this invention, a fast response temperature sensor assembly includes a support substrate, a fast response temperature sensor and a coupling means. The support substrate has a low thermal conductivity, a low heat capacity, and a low density. The coupling means secures the temperature sensor to the substrate thereby strengthening the mechanical integrity of the temperature sensor. Further, if desired, additional support material forming a second substrate can be attached to the support substrate. The second substrate can have increased structural length and have a thermal conductivity higher than the support substrate. The higher thermal conductivity does not substantially affect the response time of the temperature sensor because the second substrate is thermally isolated from the temperature sensor by the support substrate.

DETAILED DESCRIPTION OF THE INVENTION

Figure 1:
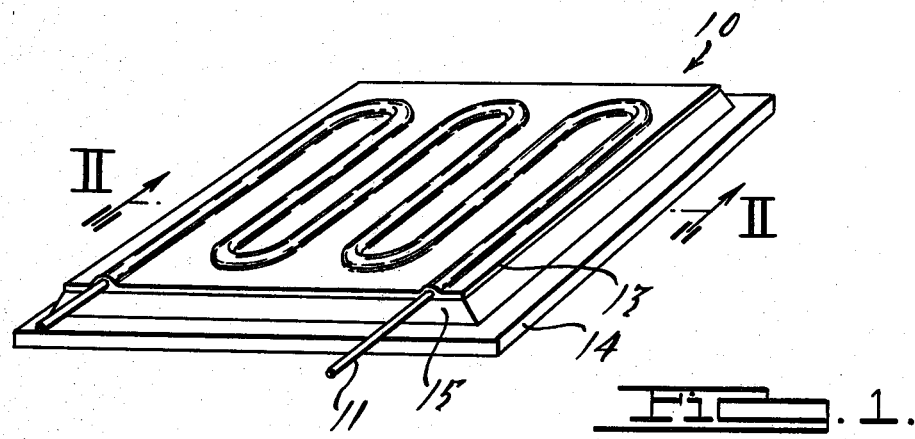
FIG. 1 is a perspective view of a temperature sensor in accordance with an embodiment of this invention.
Figure 2:
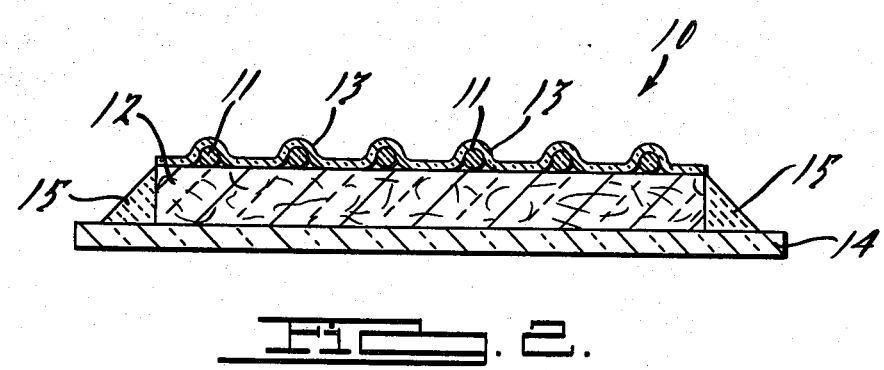
FIG. 2 is a cross sectional view of a temperature sensor assembly in accordance with an embodiment of this invention.

Referring to FIGS. 1 and 2, a temperature sensor assembly 10 includes a sensor 11 which is attached to a foam glass substrate 12 by frit seals 13. Additionally, foam glass substrate 12 is attached to a quartz plate 14 by ceramic cement 15.

Such a temperature sensor assembly 10 is particularly advantageous for use at temperatures less than about 300° C. The temperature sensor has a response time substantially less than the seven second response time of temperature sensors durable enough to withstand automobile operating conditions. Advantageously, foam glass substrate 12 is selected to have a low thermal conductivity, a low heat capacity and a low density.

Sensors fabricated in accordance with an embodiment of this invention have been found to have response times in the 300 to 600 millisecond range. An unsupported sensor may have a response time in the range of about 50 to 150 millisecond. Accordingly, the degradation provided by the additional structural support in accordance with an embodiment of this invention is relatively small.

Figure 3:
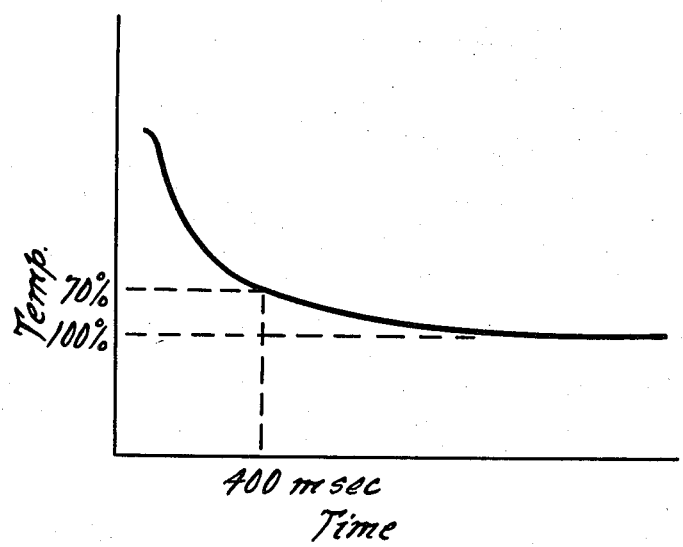
FIG. 3 is a graphical representation of the response time of a sensor in accordance with an embodiment of this invention.

Referring to FIG. 3, the response of a test sensor assembly in accordance with an embodiment of this invention is shown. The response is of a small thermistor fritted to a foam glass substrate responding to a step function change in temperature. In this case, the response time is defined to be the time required for the sensor signal to reach 70% of its final value and is about 400 milliseconds.

Frit seals 13 have been found to be quite durable and showed no damage during testing periods of several hours and assembly 10 was repeatedly cycled between 100° C. and 350° C. The duration of a typical complete cycle is less than about one minute.

A typical material for foam glass substrate 12 is a foam glass product manufactured by Corning Glass Works. This material has a density of approximately 0.112 grams per cubic centimeter and thermal conductivity of less than $5.5 \times 10^{10}$ watt per centimeter degree giving a leakage of about $3.08 \; 10^{-5}$ watt$^2$sec/cm$^4$deg$^2$. For comparison, the corresponding figure for solid glass is $1.25 \times 10^{-2}$ watt$^2$sec/cm$^4$deg$^2$.

Heat conduction theory shows that the condition for the substrate not to perturb sensor response is that $(K_s P_s C_s / K_F P_F C_F)^{\frac{1}{2}}$ is small. Here K, P, C are the thermal conductivity, density and specific heat, respectively, and S and F subscripts refer to substrate and sensor, respectively.

Following is a table comparing glass and glass foam substrates.

TABLE 1

| Substrate Material | Device Response Time | $\sqrt{\dfrac{k_s P_s C_s}{k_F P_F C_F}}$ * |
|---|---|---|
| solid glass | 8 sec. | $7.4 \; 10^{-2}$ |
| glass foam | 21 m sec. | $4.1 \; 10^{-3}$ |

*Calculated for Pt metal film

Various modifications and variations will no doubt occur to those skilled in the various arts to which this invention pertains. For example, the particular temperature sensor or additional substrate may be varied from that disclosed herein. These and all other variations which basically rely on the teachings by which this disclosure has advanced the art are properly considered within the scope of this invention as defined by the appended claims.

We claim:

1. A fast response temperature sensor assembly including:
   a support substrate having a low thermal conductivity, a low heat capacity, and a low density, said support substrate being a glass foam material having a density of about 0.112 grams per cubic centimeter and thermal conductivity of less than $5.5 \times 10^2$ watt per centimeter degree giving a leakage of about $3.08 \times 10^{-5}$ watt$^2$ sec/cm$^4$deg$^2$;
   a fast response temperature sensor; and
   coupling means for securing said temperature sensor to said support substrate thereby strengthening the mechanical integrity of said fast response temperature sensor assembly.

2. A fast response temperature sensor assembly as recited in claim 1 further comprising:
   a second substrate, attached to said support substrate, having a greater structural rigidity than said support substrate so that said fast response temperature sensor assembly has a further increased structural and mechanical rigidity.

3. A fast response sensor assembly as recited in claim 2 wherein said second substrate is connected to said support substrate by ceramic cement.

4. A fast response temperature sensor assembly as recited in claim 3 wherein said coupling means for securing the temperature sensor to said support substrate is a glass frit seal.

5. A method for fabricating a fast response temperature sensor comprising the steps of:
   forming a glass foam support substrate;
   positioning a fast response temperature sensor on the surface of the foam glass substrate; and
   attaching the sensor to the foam glass substrate by means of frit seals.

6. A method as recited in claim 5 further comprising the step of positioning the foam glass substrate on a quartz plate having greater structural strength than the foam glass substrate.

7. A method as recited in claim 6, further comprising the step of attaching the foam glass substrate to the quartz plate by means of ceramic cement.

* * * * *